United States Patent [19]

Tamada et al.

[11] Patent Number: 4,806,964
[45] Date of Patent: Feb. 21, 1989

[54] METHOD OF CONTROLLING DIAPHRAGM DRIVING IN ELECTRONIC STILL CAMERA AND DEVICE THEREFOR

[75] Inventors: Kazukiyo Tamada, Tokyo; Motohiko Horio, Omiya; Kiyotaka Sato, Tokyo, all of Japan

[73] Assignee: Fuji Photo Film Co., Ltd., Kanagawa, Japan

[21] Appl. No.: 134,115

[22] Filed: Dec. 17, 1987

[30] Foreign Application Priority Data

Dec. 26, 1986 [JP] Japan .................. 61-311118

[51] Int. Cl.$^4$ .................................... G03B 7/095
[52] U.S. Cl. ........................ 354/452; 352/141; 358/228
[58] Field of Search ............... 358/228; 352/141; 354/439, 446, 449, 451, 452

[56] References Cited

U.S. PATENT DOCUMENTS

| | | | |
|---|---|---|---|
| 3,813,680 | 5/1974 | Wagensonner et al. | 354/452 |
| 4,558,368 | 12/1985 | Aoki et al. | 352/141 |
| 4,649,431 | 3/1987 | Terashi | 352/141 |
| 4,684,995 | 8/1987 | Baumeister | 358/228 |
| 4,714,966 | 12/1987 | Saito et al. | 358/228 |
| 4,739,411 | 4/1988 | Bolton | 352/141 |

Primary Examiner—Russell E. Adams
Attorney, Agent, or Firm—Sughrue, Mion, Zinn, Macpeak & Seas

[57] ABSTRACT

A method of controlling diaphragm driving in an electronic still camera, wherein a diaphragm is controlled such that an exposure value of a subject on an image forming screen can become a proper exposure value, and a device therefore. In this control of diaphragm driving, the photometric values obtained from every times of photometry are determined to be higher or lower than the proper exposure value. When the photometric values are determined to be higher than the proper exposure value continuously given times, the diaphragm is closed until the photometric values are determined to be lower than the proper exposure value. When the photometric values are determined to be lower than the proper exposure value continuously the given times, the diaphragm is opened until the photometric values are determined to be higher than the proper exposure value.

6 Claims, 3 Drawing Sheets

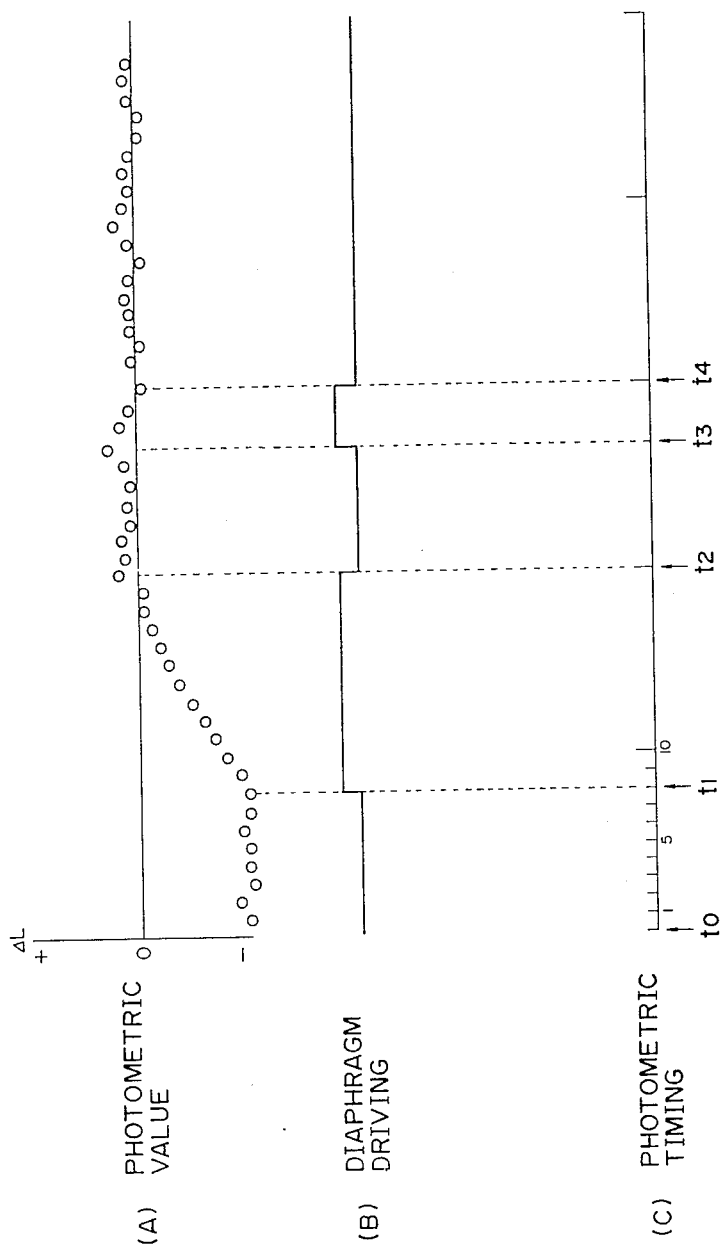

METHOD OF CONTROLLING DIAPHRAGM DRIVING IN ELECTRONIC STILL CAMERA AND DEVICE THEREFOR

BACKGROUND OF THE INVENTION

1. Field of the Invention

This invention relates to a method of controlling diaphragm driving in an electronic still camera and a device therefor, and more particularly to a method of controlling diaphragm driving during photographing in a movie mode of an electronic still camera and a device therefor.

2. Description of the Related Art

Recently, there has been developed an electronic still camera wherein an image pickup device such as a solid state image sensing device or an image pickup tube is combined with a recording device using a magnetic disc which is an inexpensive rotary recording medium and yet has a comparatively high memory capacity, a subject is still-photographed pure-electronically and the photograph recorded into a rotating magnetic medium, and the reproduction of an image is carried out by a television, a printer and the like, which are provided separately.

In this electronic still camera, through the utilization of characteristics of an image sensing device such as a CCD(Charge Coupled Device), a movie mode can be used, in which the electric charge of the image sensing device is read out and so on to obtain images continuously, with a shutter being opened.

In the electronic still camera of the type described, an open photometric system is adopted because of its ability to frame and to measure distance easily in the same manner as in the conventional so-called silver salt still camera. In this case, in the still mode where still photographing is carried out, it is necessary to instanteously stop down from an open position to reach to a proper exposure value calculated on the basis of the photometric data. Because of this, in the still mode, high response in the control of diaphragm driving is required.

In contrast thereon, in photographing in the movie mode, the photometry and the control of diaphragm driving are carried out in a state where stop-down is performed on the basis of the results of photometry. The exposure value may be compensated by a value of variations in brightness as compared with the photographing in the still mode, thus enabling to reduce the value of action of driving the diaphragm in general.

In the conventional electronic still camera of the type described, as to the control of the diaphragm driving, an insensitive zone of a suitable width is provided to the proper exposure value obtained from the ressults of photometry of the subject, and, when an actual exposure value is within the range of the insensitive zone, the diaphragm driving is brought to a stop. This control method is simple, whereby the method is used widely in general, and, when the accuracy of photometry is good and stabilized, the method proves to be effective. However, in the photographing in the still mode, high speed response should be made to the result of photometry. If the control system is constructed in this way, then the diaphragm driving system gives a sharp response to the result of photometry, whereby, in the case of photographing in the movie mode, hunting is resulted. Accordingly, in order to cope with the photographing of both the still mode and the movie mode, the aforesaid insensitive zone should necessarily be widened.

When the width of the insensitive zone provided for the proper exposure value is widened as described above, although the accuracy may be lowered, hunting does not occur during photographing, the system becomes strong against noises and suitable for the photographing in the movie mode. However, such a problem is presented that the still camera cannot cope with the photographing (still photographing) in the still mode, which is the primary function of the electronic still camera, because of lowered accuracy.

SUMMARY OF THE INVENTION

The present invention has been developed to obviate the above-described disadvantages of the prior art and has as its object the provision of a method of controlling diaphragm driving in an electronic still camera, wherein, in the two photographing modes including a still mode and a movie mode, the response and the accuracy of control are satisfactory.

It is another object of the present invention to provide a device for carrying out the just-described method.

To achieve the above-described and other objects, the present invention contemplates in a method controlling diaphragm driving in an electronic still camera, wherein photometry is carried out periodically at given time intervals and photometry values obtained, a proper exposure value is calculated in accordance with the obtained photometry values, diaphragm driving is controlled such that an actual exposure value on an image forming screen of the subject can be equal to the proper exposure value, wherein only when states where a predetermined number (N) of consecutive obtained photometry values differ from the proper exposure value, the diaphragm driving is controlled until when the obtained photometry value reach the proper exposure value.

According to the present invention, in controlling the diaphragm driving, photometry is carried out periodically at given time intervals without providing an insensitive zone for the value of the proper exposure, and, only when the obtained photometry values differ from the proper exposure value N times consecutively, the diaphragm driving is controlled until when the values of photometry reach the proper exposure value, so that, even if the response of the control system to the value of photometry is raised so as to suit the photographing in the still mode, the control system does not cause hunting during the photographing in the movie mode, the exposure value is constantly controlled to a value in proximity of the proper exposure value, and the control of the diaphragm driving, which meets the required characteristics for the photographing in the movie mode, i.e. the relatively moderate control of the diaphragm driving can be carried out.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 3 is an explanatory graph showing the control of the diaphragm driving carried out by the operation-/exposure control circuit.

DETAILED DESCRIPTION OF THE INVENTION

Detailed description will hereunder be given of the preferred embodiment of a device for controlling a diaphragm driving in an electronic still camera according to the present invention with reference to the accompaning drawings.

Figure 1:
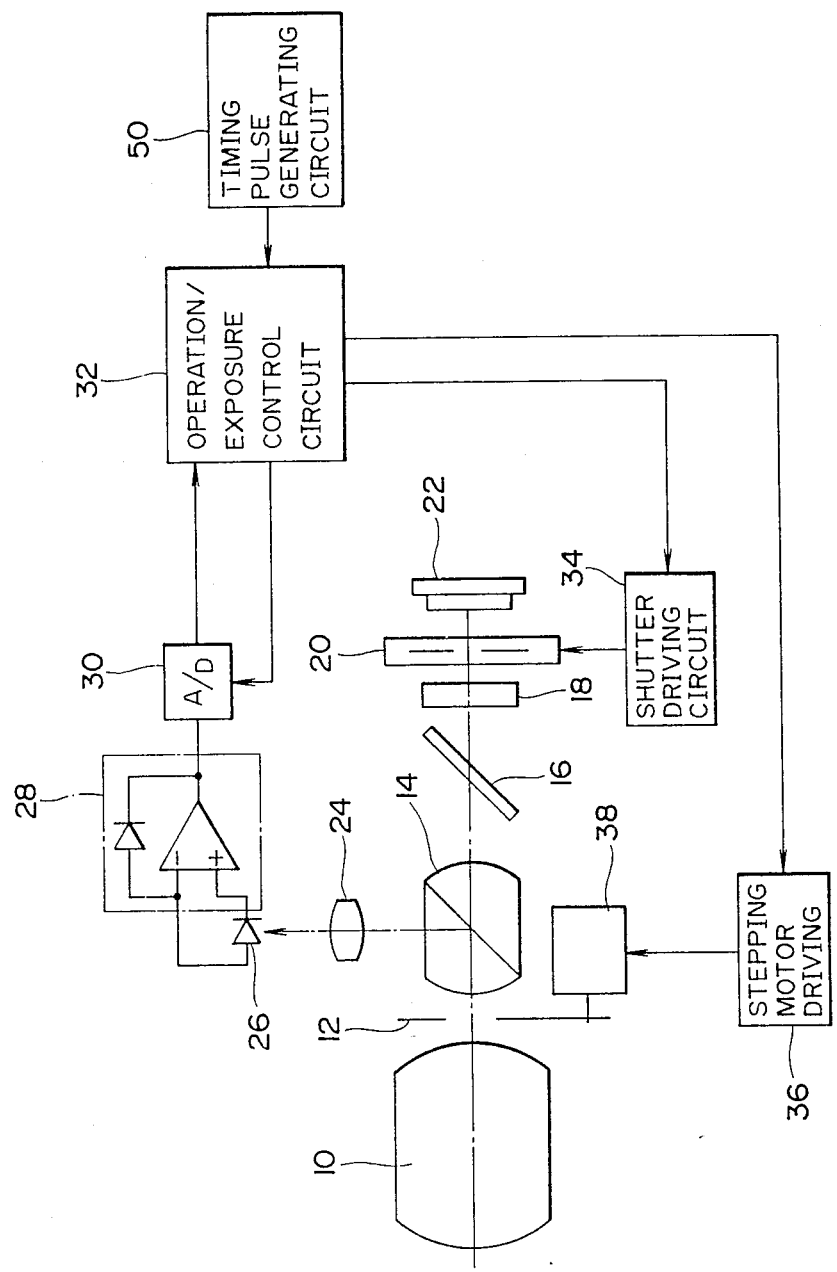
FIG. 1 is a block diagram showing the arrangement of the essential portions of the electronic still camera, to which in applied the present invention.

FIG. 1 shows the arrangement of the essential portions of one embodiment of the electronic still camera, to which is applied the present invention. In FIG. 1, a photographing optical system includes a zoom lens system 10 as being a front group lens system, a diaphragm 12 and a master lens system 14, for example. The master lens system 14 additionally functions as a beam splitter to a photometric optical system 24. Designated at 16 is mirror to a finder optical system, which springs up to the outside of a light path during photographing. Denoted at 18 is an optical filter and 20 a shutter. The shutter 20 is opened for a predetermined time after the mirror springs up and the diaphragm 12 is stopped down. However, in the movie mode, the shutter remains open. Designated at 22 is the CCD as being the image sensing device.

Part of rays of the subject, which is taken into the photometric optical system 24 is received by a photometric sensor 26, amplified by a photometric amplifier 28 and inputted into an operation/exposure control circuit 32 through an A/D converter 30. This operation/exposure control circuit 32 is formed of a microcomputer or the like for example, and incorporates therein counters CNRA and CNRB which are used for control of the diaphragm driving, which will be described hereunder. Here, the counter CNRA is a counter which is counted up when a deviation $\Delta L$ between the photometric value and the proper exposure value is positive and cleared when $\Delta L$ is negative. Furthermore, the counter CNRB is counted up when the aforesaid deviation is negative and cleared when $\Delta L$ is positive. This operation/exposure control circuit 32 is constructed such that the circuit 32 controls the shutter 20 and the diaphragm 12 on the basis of information such as a brightness of the subject taken in, through a shutter driving circuit 34 and the diaphragm driving mechanism, to thereby obtain the proper exposure value.

The diaphragm driving mechanism includes a stepping motor 38 for adjusting the opening of the diaphragm and a stepping motor driving circuit 36. The operation/exposure control circuit 32 has a pulse generating function for driving the stepping motor 38. Designated at 50 is a timing pulse generating circuit. The operation/exposure control circuit 32 carries out the photometry and the control of diaphragm driving in response to the timing pulses outputted from the timing pulse generating circuit 50.

Figure 2:
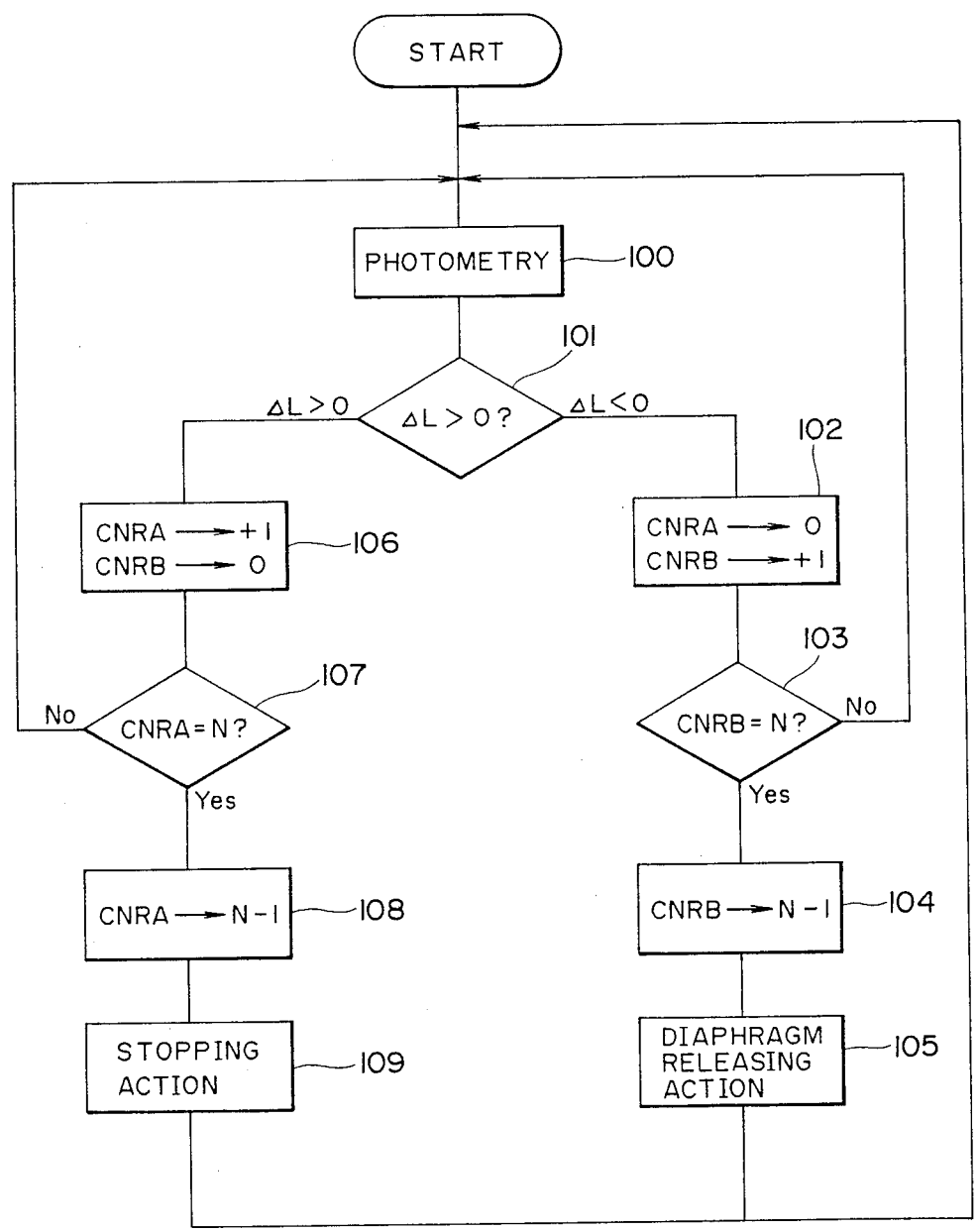
FIG. 2 is a flow chart showing the contents of a program carried out by an operation/exposure control circuit shown in FIG. 1.

The contents of the control of diaphragm driving, which is carried out by the operation/exposure control circuit 32 will hereunder be described with reference to FIGS. 2 and 3. FIG. 2 shows the contents of the program carried out by the operation/exposure control circuit 32. Referring to the drawing, in Step 100, the photometry is carried out in response to the timing pulse outputted from the timing pulse generating circuit 50. In the next Step 101, the deviation $\Delta L$ between the photometric values and the proper exposure value calculated on the basis of the photometric values is calculated, and determination is made as to whether the $\Delta L$ is positive or not. When $\Delta L$ is negative, the routine proceeds to Step 102, where the counter CNRA is cleared, and simultaneously, the counter CNRB is counted up. Further, in Step 103, determination is made as to whether the contents of counting by the counter CNRB reach N (N =8 for example) or not. When it is determined that the contents of counting by the counter CNRB do not reach N in Step 103, the routine returns to Step 100, where the similar process is repeated. Then, when the states were the deviation $\Delta L$ is negative continue N times, the routine proceeds to Step 104, where the contents of counting by the counter CNRB is decremented by 1, in the next Step 105, the diaphragm opening action is carried out, and the routine returns to Step 100. In Step 101, if it is determined that the deviation $\Delta L$ still remains negative even in this state, the contents of counting by the counter CNRB are determined to be N Step 103, the contents of counting is decremented by 1 in the same manner as above in Step 104, the diaphragm opening action is carried out in Step 105, and the routine returns to Step 104. More specifically, as shown in FIG. 3, the photometry is started from a time to, when the state where the deviation $\Delta L$ is negative continues until a time $t_1$ as shown in FIG. 3 (A), the counted value of the counter CNRB becomes 8, whereby the diaphragm opening action is started at the time $t_1$, and this diaphragm opening action continues until the deviation $\Delta L$ moves to the positive state from the negative state. During the period of time from the time $t_1$ to the time $t_2$, the counter CNRA is in a cleared state all the time, whereas, in the counter CNRB, the contents of counting change between two states including N-1 and N add the time.

After the deviation $\Delta L$ moves from the negative state to the positive state due to the driving of the diaphragm 12, the routine proceeds from Step 101 to Step 106, where the counter CNRA is counted up and the other counter CNRB is cleared, and the routine proceeds to the next Step 107, where determination is made as to whether the contents of counting by the CNRA reach N or not, i.e. the deviation $\Delta L$ continues in the positive states N times or not. When it is determined "NO" in Step 107, the routine returns to Step 100, where, further, the photometry is carried out, and the similar process is performed. Then, when it is determined that the contents of the counter CNRA reach N in Step 107, the contents of the counter CNRA is decremented by 1 in Step 108, the stopping action is carried out in the next Step 109, the routine returns to Step 100, and the similar process is repeated. This case copes with the case where, after the deviation $\Delta L$ moves from the negative state to the positive state at the time $t_2$, the states where the deviation $\Delta L$ is in the positive states continue N times, e.g. 8 times, the stop driving is started at a time of $t_3$, and further, at a time of $t_4$ where the deviation $\Delta L$ moves from the positive state to the negative state, the action of stop driving is completed.

In this embodiment, only when the states where the photometry differs from the proper exposure value N consecutive times, the diaphragm driving is carried out, so that the numerical value of this N is incremented so as to reduce the influence of the noises mixed up into a photometric signal during photometry. No insensitive zone is provided for the proper exposure value as being a target value in the control of diaphragm driving, so that the accuracy of control in the control of diaphragm driving can be improved. In addition, such an advantage can be offered that an instantaneous change and the like of the photometric value, which occur when the subject having high variations in the brightness and the camera are turned can be coped with immediately. In this embodiment, the stepping motor is used for the diaphragm driving, however, the present invention need not necessarily be limited to this, and diaphragm control system using a meter, a DC motor and the like may be adopted.

As has been described hereinabove, according to the present invention, only when the states where the photometric value differ from the proper exposure value N consecutive times, the diaphragm driving is controlled until the photometric values reach the proper exposure value, so that the response and the accuracy of control can be improved in the two photographing modes including the still mode and the movie mode.

Incidentally, since an increase in value of N makes the system becomes strong against noises, while, it leads to a delay in the initial action, it is necessary to set the value of N to a suitable value. In the experiments, satisfactory results were obtained when N was 8.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of controlling diaphragm driving in an electronic still camera, wherein a diaphragm is controlled such that an exposure value of a subject on an image forming screen can be a proper exposure value, said method comprising the steps of:
   (i) performing photometry on an incident ray and obtaining a photometric value accordingly;
   (ii) determining whether said obtained photometric value is higher or lower than the power exposure value;
   (iii) performing said steps i) and ii) repeatedly, at regular time intervals until a number of consecutive ones of said photometric values, all of which are greater or all of which are lower than said proper exposure value, equals a predetermined number;
   (iv) if said consecutive ones of said photometric values are higher than said proper exposure value, closing the diaphragm incrementally until said photometric values are lower than the proper exposure value; and
   (v) if said consecutive ones of said photometric values are lower than said proper exposure value, opening the diaphragm incrementally until said photometric values are higher than the proper exposure value.

2. The method of claim 1, wherein said number is 8.

3. A device for controlling diaphragm driving in an electronic still camera, comprising:
   photometric means for performing photometry on an incident ray at a predetermined time interval and obtaining a plurality of photometric values in a time sequence;
   determining means for determining whether each of the time sequence of photometric values differs from a proper exposure value;
   a first counter, responsive to said determining means, said first counter being incremented by one each time said determining means determines that one of said time sequence of said photometric values is higher than the proper exposure value and being reset to zero each time said determining means determines that said one photometric value is lower than the proper exposure value;
   a second counter, responsive to said determining means, said second counter being incremented by one each time said determining means determines that said one photometric value is lower than the proper exposure value and being reset to zero each time said determining means determines that said one photometric value is higher than the proper exposure value;
   closing/opening means for selectively closing and opening a diaphragm in said electronic still camera;
   first control means, responsive to said first counter, for outputting a signal for said closing/opening means to move the diaphragm toward a closed position and for decrementing the first counter by one when a content of the first counter reaches a preset value; and
   second control means, responsive to said second counter, for outputting a signal for said closing/opening means to move the diaphragm toward an open position and for decrementing the second counter by one when a content of the second counter reaches a preset value.

4. The device set forth in claim 3, wherein said electronic still camera functions in a still mode for still photographing and in a movie mode for obtaining continuous images from an image sensing device.

5. The device set forth in claim 3, wherein said photometric means measures a quantity of incident ray passing through a photographing lens and the diaphragm.

6. The device set forth in claim 3, wherein said closing/opening means includes a stepping motor and a stepping motor driving circuit.

* * * * *